United States Patent [19]

Boyesen

[11] Patent Number: 4,924,819

[45] Date of Patent: May 15, 1990

[54] ROTARY EXHAUST CONTROL VALVE FOR TWO-STROKE CYCLE ENGINES AND PROCESS FOR USING THE SAME

[75] Inventor: Eyvind Boyesen, Kempton, Pa.

[73] Assignee: Performance Industries, Inc., Kempton, Pa.

[21] Appl. No.: 351,608

[22] Filed: May 15, 1989

Related U.S. Application Data

[63] Continuation-in-part of Ser. No. 96,551, Sep. 15, 1987, Pat. No. 4,829,946.

[51] Int. Cl.$^5$ .............................................. F02B 75/02
[52] U.S. Cl. .................................. 123/65 PE; 123/323
[58] Field of Search .............. 123/65 P, 65 V, 65 PE, 123/323, 190 AA, 190 A

[56] References Cited

U.S. PATENT DOCUMENTS

| | | | |
|---|---|---|---|
| 2,403,844 | 7/1946 | Bolli | 123/323 |
| 2,798,466 | 7/1957 | Rzepecki | 123/190 A |
| 3,475,905 | 11/1969 | Wilford | 123/323 |
| 4,121,552 | 10/1978 | Mithuo et al. | |
| 4,244,338 | 1/1981 | Rassey | 123/190 A |
| 4,285,311 | 8/1981 | Iio | |
| 4,321,893 | 3/1982 | Yamamoto | |
| 4,325,335 | 4/1982 | Shibata | |
| 4,364,346 | 12/1982 | Shiohara | |
| 4,391,234 | 7/1983 | Holzleitner | |
| 4,399,788 | 8/1983 | Bostelmann | |
| 4,672,924 | 6/1987 | Hiasa et al. | |
| 4,672,925 | 6/1987 | Miyata et al. | |
| 4,829,946 | 5/1989 | Boyesen | 123/65 PE |

FOREIGN PATENT DOCUMENTS

| | | | |
|---|---|---|---|
| 3712750 | 11/1988 | Fed. Rep. of Germany | 123/65 PE |
| 62-49445 | 10/1987 | Japan | |
| 62-243923 | 10/1987 | Japan | |
| 62-176437 | 11/1987 | Japan | |
| 62-267522 | 11/1987 | Japan | |
| 62-267523 | 11/1987 | Japan | |
| 62-271925 | 11/1987 | Japan | |
| 62-271926 | 11/1987 | Japan | |
| 62-271927 | 11/1987 | Japan | |
| 63-21319 | 1/1988 | Japan | |
| 63-38610 | 2/1988 | Japan | |
| 63-78132 | 5/1988 | Japan | |
| 63-30485 | 6/1988 | Japan | |
| 63-115530 | 7/1988 | Japan | |
| 63-192913 | 8/1988 | Japan | |
| 63-151936 | 10/1988 | Japan | |
| 63-248913 | 10/1988 | Japan | |
| 64-15425 | 1/1989 | Japan | |
| 64-19117 | 1/1989 | Japan | |
| 64-51730 | 3/1989 | Japan | |
| 64-83818 | 3/1989 | Japan | |

OTHER PUBLICATIONS

The High-Speed Two-Stroke Petrol Engine, Philip H. Smith, pp. 104–113, 125, published by Autobooks, Burbank, Calif., Feb. 1965.

Primary Examiner—David A. Okonsky
Attorney, Agent, or Firm—Ferrill and Logan

[57] ABSTRACT

A rotary exhaust control valve for two-stroke cycle engines is disclosed. This valve is oriented at least partially within the exhaust passage and, for each revolution of the engine, delays flow from the combustion chamber through the exhaust passage during the expansion stroke of the piston while permitting full opening of the exhaust passage and blow down to initiate the scavenging cycle of the engine. The valve of the present invention permits complete opening and closing of the exhaust passage during the appropriate portions of the engine cycle. Also disclosed is a mechanical linkage mechanism between the rotary valve and the crankshaft to provide precise control of the exhaust valve throughout the engine cycle.

20 Claims, 4 Drawing Sheets

ROTARY EXHAUST CONTROL VALVE FOR TWO-STROKE CYCLE ENGINES AND PROCESS FOR USING THE SAME

This application is a continuation-in-part of my co-pending application Ser. No. 096,551 filed September 15, 1987, and now U.S. 4,829,946.

BACKGROUND OF THE INVENTION

1. Field of the Invention

The present invention relates to new and useful improvements in two-stroke cycle gasoline engines and to new and useful improvements in exhaust valves for such engines. More particularly, the present invention provides a rotary exhaust valve which delays the opening of the exhaust port during the expansion stroke and, if desired, advances the closing of the exhaust port during the compression stroke while, at the same time, fully opening the exhaust port and permitting blow down and scavenging of the combustion chamber.

2. Description of the Prior Art

It has been know in the past to provide speed-controlled exhaust valves which will remain partially closed at slow speeds of the engine, delaying communication between the combustion chamber and exhaust passage beyond the usual opening of the exhaust port by the piston, and move upward, fully exposing the exhaust passage to the combustion chamber through the exhaust port, at high engine speeds. Such valves, however, do not provide the advantages of longer expansion and compression strokes while also permitting maximum scavenging.

In the parent application, United States Patent Application S.N. 096,551, now allowed, a novel exhaust control valve is disclosed employing a linkage to the crankshaft which providing opening and closing of the exhaust passage during each cycle of the engine. This invention provides many distinct advantages, including an improved power stroke, more efficient and thorough combustion of fuel, less short circuiting of combustible mixture, and improved performance of downstream pollution control devices, such as catalytic converters, due to higher and more uniform exhaust temperatures. Although the invention of the parent application is believed to function quite well, applicant has found that further improvements to the basic concept are possible through use of improved valve elements, which produce more effective valving, and improved drive mechanisms, which are simpler, lighter, and more reliable in operation.

Accordingly, it is a primary object of the present invention to provide an exhaust control valve which provides complete sealing of the exhaust passage when the valve is closed and provides minimal turbulent flow throughout its operation.

It is a further object of the present invention to provide a rotary exhaust control valve which directly utilizes the rotary movement of the crankshaft drive mechanism to control the actuation of the valve.

It is an additional object of the present invention to provide an exhaust control valve drive mechanism which provides a direct linkage between the crankshaft and the valve means.

It is another object of the present invention to provide an exhaust control valve which is relatively simple in design, provides reliable and straightforward operation and inherent ease of manufacture.

SUMMARY OF THE INVENTION

A rotary exhaust control valve for two-stroke cycle engines is provided within the exhaust passage of the engine. The valve, which in its preferred embodiment for ease in manufacture is cylindrical in shape, is interconnected with the engine crankshaft and rotates between open and close positions in timed relation to the piston movement to delay opening of the exhaust passage during the expansion stroke of the piston and advance closing of the exhaust passage during the compression stroke of the piston. After the exhaust passage is initially opened, the valve rotates towards its open position to allow the expulsion of the stream of exhaust gases passing through the exhaust port, so as not to interfere with scavenging of the combustion chamber.

The valve of the present invention provides improved scavenging of the combustion chamber, improved combustion of fuels with more thorough burning of hydrocarbons, and a longer power stroke, less short circuiting of combustible mixture and better operation of pollution control devices. Further, a direct drive mechanism between the crankshaft and the rotary valve is provided which employs the rotation of the crankshaft to actuate the rotary valve.

DESCRIPTION OF THE DRAWINGS

The operation of the present invention should become apparent from the following description when considered in conjunction with the accompanying drawings, in which.

DETAILED DESCRIPTION OF THE PREFERRED EMBODIMENT

Figure 1:
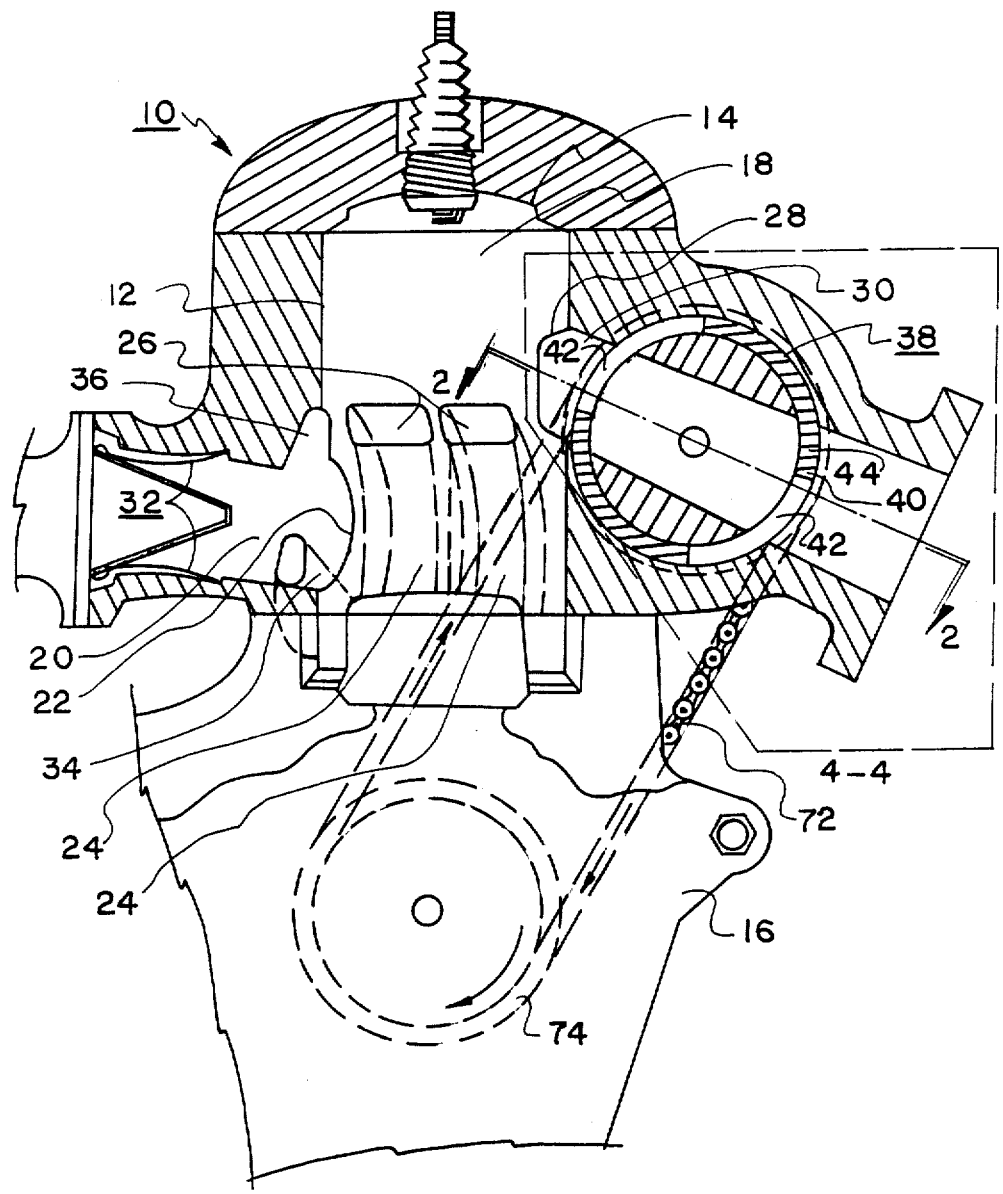
FIG. 1 is a longitudinal sectional view, partially in elevation, of a two-stroke cycle engine incorporating the present invention.

In the illustrated embodiment of the present invention, the exhaust control valve is shown in conjunction with a single cylinder fuel injected two-stroke cycle, variable speed, crankcase compression engine as used, for example, on motorcycles. However, the exhaust control valve of the present invention has many useful applications in other than the engine shown.

The engine 10 includes a cylinder 12, a cylinder head 14 and a crankcase housing 16, with a piston, connecting rod and crankshaft (not shown). The cylinder 12 includes a combustion chamber 18, an inlet or intake passage 20 terminating in the inlet port 22, transfer passages 24, 24 terminating in transfer ports 26, 26 and an exhaust port 28 leading to the exhaust passage 30. In the inlet passage 20 there are reed valves 32, 32, a supplement transfer passage 34 and a booster port 36, similar to those described in my prior U.S. Pat. No. 3,905,341.

As is known, in this type of engine, the piston skirt, not shown, serves as the valve means for opening and closing the inlet port 22, booster port 36, transfer ports 26 and exhaust port 28. In the conventional engine of this type, as the piston is moving toward its bottom dead center position, the upper edge of the piston starts to open the exhaust port 28 at about the 90° position of the crankshaft, 0° being the crankshaft position at top dead center and 180° being the crankshaft position at bottom dead center. Upon continued further downward movement of the piston, the transfer ports 26 and booster port 36 start to open at approximately the 120° position of the crankshaft. When the piston reaches bottom dead center, all of these above ports are fully uncovered or open. Conversely, on the compression stroke of the piston, the transfer ports 26 and booster ports 36 are closed by the piston at the 240° position of the crankshaft and the exhaust port 28 is closed by the piston at the 270° position of the crankshaft. Thus, in the conventional engine of this type, the effective expansion stroke of the piston and the effective compression stroke of the piston each occur during only a 90° rotation of the crankshaft.

In accordance with the present invention, valve means 38 are provided to delay fluid flow from the combustion chamber 18 through the exhaust passage 30 during the expansion stroke until after the piston has initially uncovered the upper edge of the exhaust port 28, but permit such fluid communication prior to, or simultaneously with, the transfer ports 26 being opened. Similarly, this same valve means 38 can shut off fluid communication through the exhaust passage 30 prior to the piston closing of the exhaust port 28. This increases the effective length of the expansion and compression strokes while still permitting proper blow down before scavenging, thereby increasing the power output of the engine 10.

Figure 2:
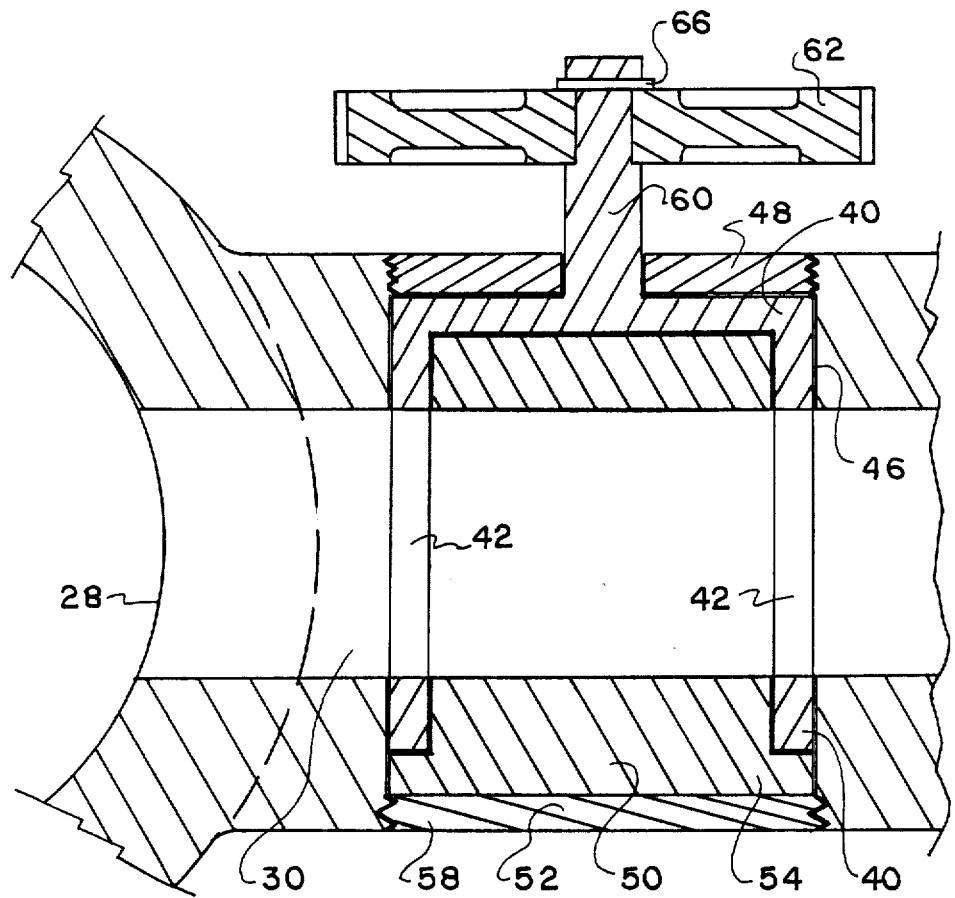
FIG. 2 is a transverse sectional view taken along the line 2—2 of FIG. 1.
Figure 3:
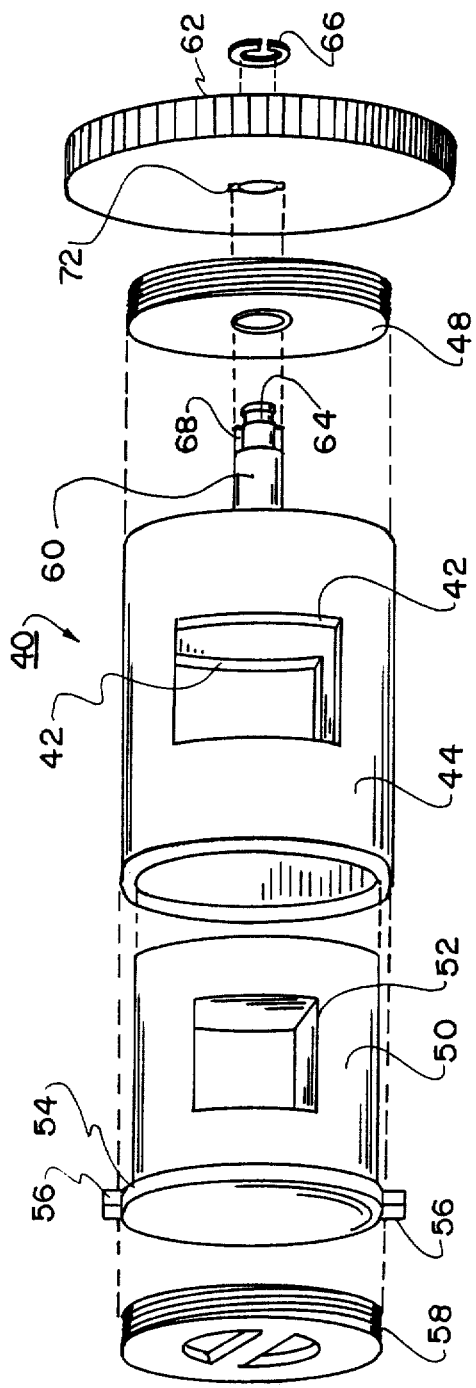
FIG. 3 is an exploded three-quarter isometric view of the valve member and insert of the present invention shown removed from the engine.

As is shown in FIGS. 1, 2 and 3, the valve means 38 of the present invention comprises a hollow, cup-shaped valve element or member 40. The valve member 40, which is essentially cylindrical, includes two opposing openings 42, 42 in its sidewall 44. The openings 42 may be adjusted in size and orientation to provide specific characteristics for various engine designs. In the embodiment shown, the openings 42, are approximately the same size, and are dimensioned to match or exceed the contour of the exhaust passage 30 when the valve member 40 is oriented in one of its two open positions per engine cycle. The openings in this embodiment are sized to provide full opening of the exhaust passage 30 at approximately 60° before bottom dead center position of the piston and full closing of the exhaust passage 30 at approximately 60° after bottom dead center position.

As shown in FIG. 2, the valve member 40 is inserted into the portion of the engine 10 which defines the exhaust passage 30 by providing a cylindrical bore 46 through at least a portion of the engine 10. The bore 46 should be of sufficient proportions that the valve member 40 may be inserted therein with its openings 42 evenly aligned with the exhaust passage 30. Additionally, the bore 40 should be of slightly larger diameter than that of the valve member 40 so that the valve member 40 may spin freely within the bore 46. The valve member 40 may be retained in the bore 46 through any known manner, including with a threaded retaining nut and bushing 48, as shown, or a locking ring. Although it is far more difficult to manufacture, it may be desirable to provide a cylindrical valve member 40 of a somewhat hour-glass shape, with the curvature of its longitudinal cross section matching the curvature of the cylinder wall 12, and orienting the valve 40 at or near the exhaust port 28 of the cylinder 12.

In order to assure even flow through the exhaust passage 30, it is believed to be desirable to provide a stationary cylindrical insert 50 with an aperture or passageway 52 therethrough which corresponds to the interior dimensions of the exhaust passage 30 and valve member openings 42. The insert 50 fits into the interior of the valve member 40 and, when the valve 40 is in a fully open position, provides a virtually uniform passageway through the exhaust passage 30. The insert 50 should have an outside dimension just slightly smaller than the inside diameter of the valve member 40 to allow for free spinning of the valve member 40.

In order to assure that the valve member is properly aligned within the bore, it is believed to be desirable to provide a shoulder 54 on the outside edge of the insert 50 of a diameter of approximately the same as the outside diameter of the valve member 40. Pins 56, 56 or other locking means, corresponding to complementary slots (not shown) in the engine 10, should be provided on the shoulder 54 to prevent the insert 50 from rotating with the valve member 40. Again, the insert 50 may be retained in place within the bore 46 through any known manner, such as with a retaining nut 58 as shown.

The rotary valve member 40 may be driven in any manner which will translate the rotary motion of the crankshaft of the engine 10 into rotary action of the valve 40. One such mechanism is a linkage system similar to that disclosed in my United States Patent application S.N. 096,551, now allowed. However, the prefer form of valve drive for the present invention is described below.

Coaxial with the valve member 40, and affixed to the center of its closed end, is a shaft 60. The shaft 60 passes through nut 48 and attaches to a first sprocket means 62 by way of a groove 64 and locking ring 66 or other known manner of attachment. A keyway 68 on the shaft 60 and a slot 70 in the first sprocket 62 will retain the sprocket in correct alignment with the valve member 40.

Figure 4:
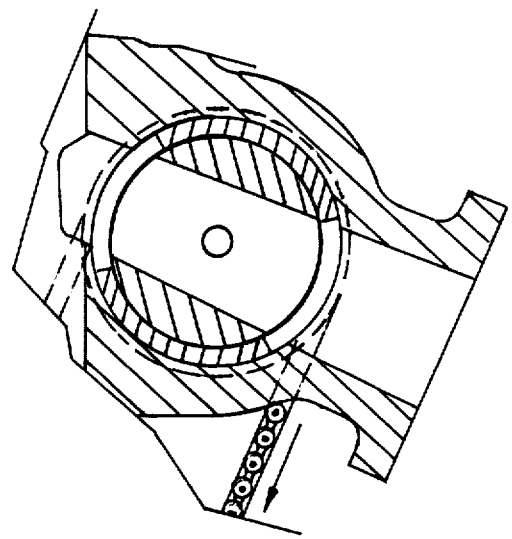
FIG. 4 is an enlarged view of the portion of FIG. 1 designated 4—4, with the valve element of the present invention in a fully open position and showing the valve element and its sprocket connection to the rotary valve drive chain.

The valve member 40 is driven by a drive chain 72 from a second sprocket means 74 attached to the crankshaft of the engine 10. If the two sprocket means are the same size, a direct one-to-one drive will be provided, so that each turn of the crankshaft will provide one turn of the rotary valve 40. Since the piston skirt will close the exhaust port 28 during one of the two openings of the rotary valve for each cycle, the above configuration provides one effective opening of the exhaust passage 30 during each engine cycle. The direct linkage to the rotating crankshaft assures precise timing of the rotary valve with the crankshaft and piston movement. The valve member 40 is shown in its fully open position in FIG. 4.

If slower valve rotation is desired, it should be noted that a smaller second sprocket means 74 may be provide of one-half the size of the first sprocket means 62——— producing one rotation of the valve member for each two rotations of the crankshaft. Since the piston shuts the exhaust port 28 during one of the two openings of the valve member 40 during each rotation, this could greatly reduce the rotational speed of the valve member 40. However, with the slower valve rotation, both faces of the exhaust valve 40 would then alternate providing the exhaust passage and the openings 42, 42 may have to be modified to accommodate for this.

In the position as shown in FIG. 1, the rotary valve 40 is approximately midway between the top of the exhaust passage 30 and the top of the transfer ports 26, and upon rotation of the crankshaft, will move clockwise to completely close the exhaust passage 30. In this position, the upper edge of the upward moving piston has just closed the transfer ports 26 and is beginning to compress the gases in the combustion chamber 18. When the valve member 40 continues its clockwise rotation enough to close the exhaust passage 30, a seal will be provided which prevents the compressing gases in the combustion chamber from entering the exhaust passage 30, thus avoiding the loss of unburned fuel.

In the downward cycle of the piston, the exhaust passage 30 remains blocked so to prevent the expanding gases in the combustion chamber from entering the exhaust passage 30. With this arrangement, the effective expansion force on the piston is extended from 90° rotation of the crankshaft to approximately 105 to 120-125° rotation of the crankshaft. This increases the length of the power stroke of the piston by more than twenty percent. Due to the unique characteristics of the rotary valve 38 of the present invention, a complete seal is possible regardless of whether the valve is placed at the exhaust port 28 itself or further downstream in the exhaust passage 30, as shown. The present invention also functions quite well rotating the valve element 40 counterclockwise, which opens and closes the exhaust passage 30 from the top of the exhaust passage 30 downward.

Without departing from the spirit of the present invention, it should be noted that at high engine speeds, it may be necessary to advance opening of the exhaust passage to allow adequate time for scavenging. One such method of advancing opening of the exhaust passage is shown in my United States Patent application S.N. 096,551, now allowed. Additionally, it should be noted that the present invention may also be practiced using other forms of rotary valves, including a disk rotary valve similar to those employed in engine intake passages. Further, the present invention may be employed with all forms of fuel delivery systems, including those using conventional carburetors, fuel injectors, blower scavenging or supercharging, and those with various forms of reed valves.

Figure 5:
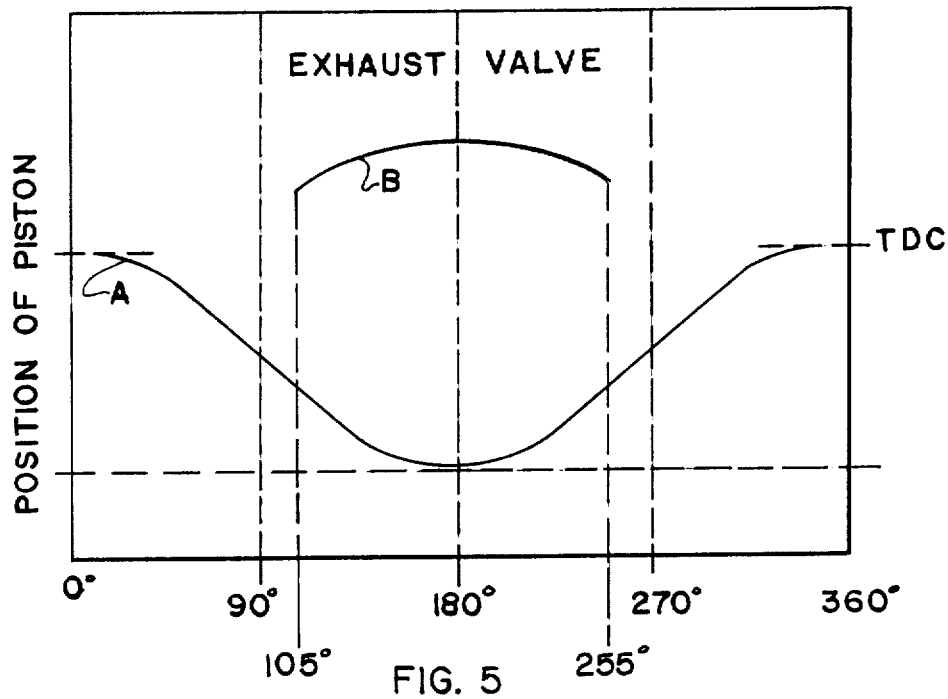
FIG. 5 is a chart showing piston position and exhaust valve position relative to crankshaft rotation.

The chart of FIG. 5 illustrates with graph A a plot of piston position versus crank angle. Graph B is a plot of the movement of the rotary valve 38 during the time the exhaust passage 30 is open to the combustion chamber 18 in the illustrated embodiment of the present invention. While the plot of graph B shows the exhaust passage being opened at 105° of crank angle and closed at 255° of crank angle, there is flexibility in the design, and the rotary valve 40 may be designed to open the exhaust passage 30 anywhere between a 90° and 120° crank angle and close anywhere up to a 270° crank angle.

It should be appreciated that the optional point of opening or closing of the exhaust valve depends in large part on many factors peculiar to individual engine design. These include: the type of change to the engine, the size of the engine, the scavenging flow, and the configuration and shape of the engine. Further, it is believed that it may be desirable to adjust the degree of opening of the exhaust passage with engine speed and throttle opening, with the valve providing a substantially constricted opening at low engine speeds and closed throttle and providing a full opening at high speeds and wide open throttle. This may be accomplished in any suitable manner, which may include a second valve element in the exhaust passage controlled by engine speed or throttle opening, or a second rotary valve element integral with the present valve means similarly controlled.

Additionally, it should be understood that the present invention may be readily applied to multiple cylinder engines. For example, in a three cylinder engine in-line engine, one rotary valve element and insert may be provided somewhat longer than three times the length of the cylinder shown in FIG. 2 and passing through the exhaust passage for each cylinder. Three identical openings in the elongated valve element appropriately aligned with each of the exhaust passages are provided as well as sealing means to prevent leakage between the exhaust passages. This structure permits identically timed exhaust porting of three cylinders simultaneously. Similar modifications of the present invention are possible to provide exhaust porting to larger or smaller engines.

While particular embodiments of the present invention have been illustrated and described herein, it should be apparent that changes and modifications may be incorporated and embodied therein within the scope of the following claims.

What is claimed is:

1. In a two-stroke cycle internal combustion engine having an air intake passage, an exhaust port leading to an exhaust passage, a piston reciprocating in continuous cycles between top and bottom dead center positions in a cylinder, said piston being interconnected with a rotatable crankshaft, at least one transfer passage providing compressed air to a combustion chamber above the piston, and valve means within the exhaust passage adapted to control flow through the exhaust passage, the improvement in said valve means comprising a rotary valve member oriented at least partially within said exhaust passage;

actuating means for said valve member to rotate said valve member continuously between an open position and a closed position; and said actuating means being in timed relation with said crankshaft rotation and piston movement to move said valve member from said closed position toward said open position after the upper edge of said piston passes downward below the upper edge of the exhaust port, and to move said valve member from said open position toward said closed position when said piston is near its bottom dead center position.

2. The apparatus of claim 1 wherein said valve member is a substantially cylindrical and is oriented at least partially within said, and, substantially perpendicularly to, said exhaust passage.

3. The apparatus of claim 2 wherein said valve member is of a diameter greater than that of the exhaust passage and the valve member rotates within a substantially cylindrical bore within the portion of the engine defining the exhaust passage, the diameter of the bore being slightly larger than the diameter of the valve member and the axis of the bore being substantially perpendicular to the axis of the exhaust passage.

4. The apparatus of claim 3 wherein the valve means includes a passageway therethrough with at least the same cross-sectional dimensions as those of the exhaust passage.

5. The apparatus of claim 3 wherein the valve member is hollow and has opposing openings therein at least as large as the cross-sectional dimensions of the exhaust passage.

6. The apparatus of claim 5 wherein a stationary cylindrical insert is provided within the valve member with a passageway therethrough of approximately the same cross-sectional dimensions as those of the exhaust passage.

7. The apparatus of claim 6 wherein the combination of the valve member oriented in its fully open position, the insert, and the exhaust passage present a substantially uniform passageway for the flow of exhaust gases.

8. The apparatus of claim 1 wherein the actuating means includes drive means between the crankshaft and the valve member.

9. The apparatus of claim 8 wherein the drive means includes a mechanical linkage between the crankshaft and the valve member.

10. The apparatus of claim 9 wherein the mechanical linkage comprises sprocket means attached to the crankshaft, sprocket means attached to the valve member, and a chain drive between each of the sprocket means.

11. The apparatus of claim 10 wherein a one to one drive between the crankshaft and the rotary valve member is provided.

12. The apparatus of claim 1 wherein said valve member is moved from said open position toward said closed position after said piston reaches its bottom dead center position.

13. In a two-stroke cycle internal combustion engine including a cylinder, a combustion chamber in the cylinder, an exhaust port spaced from and below the upper end of the combustion chamber leading to an exhaust passage, and a piston carried within said combustion chamber for reciprocation between top and bottom dead center positions, said piston being interconnected with a rotatable crankshaft and functioning as a valve member to open and close said exhaust port, and valve means within the exhaust passage adapted to control flow through the exhaust passage, the improvement comprising said valve means comprising a rotary valve element at least partially within said exhaust passage;

actuating means for said valve element to rotate said valve element continuously between an open position, providing free fluid flow through said exhaust passage, and a closed position, restricting fluid flow through said exhaust passage; and said actuating means being in timed relation with said crankshaft rotation and piston movement to move said valve element from a closed position toward an open position as the piston passes downward, and to move said valve element from the open position toward the closed position when said piston is near its bottom dead center position.

14. The apparatus of claim 13 wherein said valve element comprises a substantially cylindrical valve member oriented at least partially within and, substantially perpendicularly to, said exhaust passage.

15. The apparatus of claim 14 wherein said valve member is of a diameter greater than that of the exhaust passage and the valve member is positioned within said exhaust passage by a substantially cylindrical bore within the portion of the engine defining the exhaust passage, the axis of the bore being substantially perpendicular the axis of the exhaust passage, and said cylindrical valve member rotates within the bore.

16. The apparatus of claim 15 wherein the valve element includes a passageway therethrough with at least the same cross-sectional dimensions as those of the exhaust passage.

17. The apparatus of claim 13 wherein the actuating means includes drive means between the crankshaft and the valve element.

18. The apparatus of claim 17 wherein the drive means includes a mechanical linkage between the crankshaft and the valve element.

19. The apparatus of claim 18 wherein the mechanical linkage comprises sprocket means attached to each of the crankshaft and the valve element, and a chain drive between said sprocket means, the combination providing a direct one to one drive between the crankshaft and the rotary valve element.

20. The apparatus of claim 13 wherein said valve member is moved from said open position toward said closed position after said piston reaches its bottom dead center position.

* * * * *